UNITED STATES PATENT OFFICE.

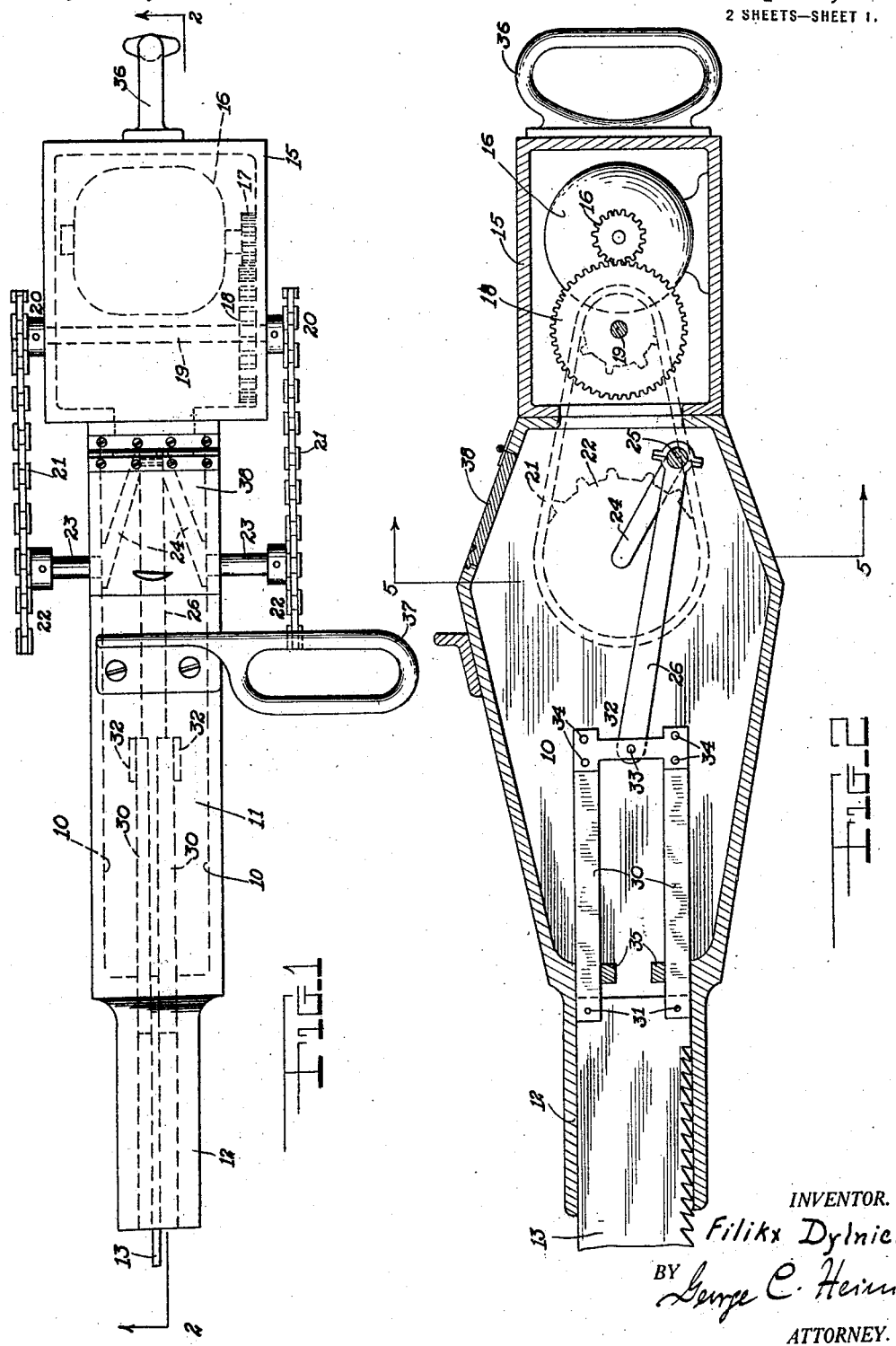

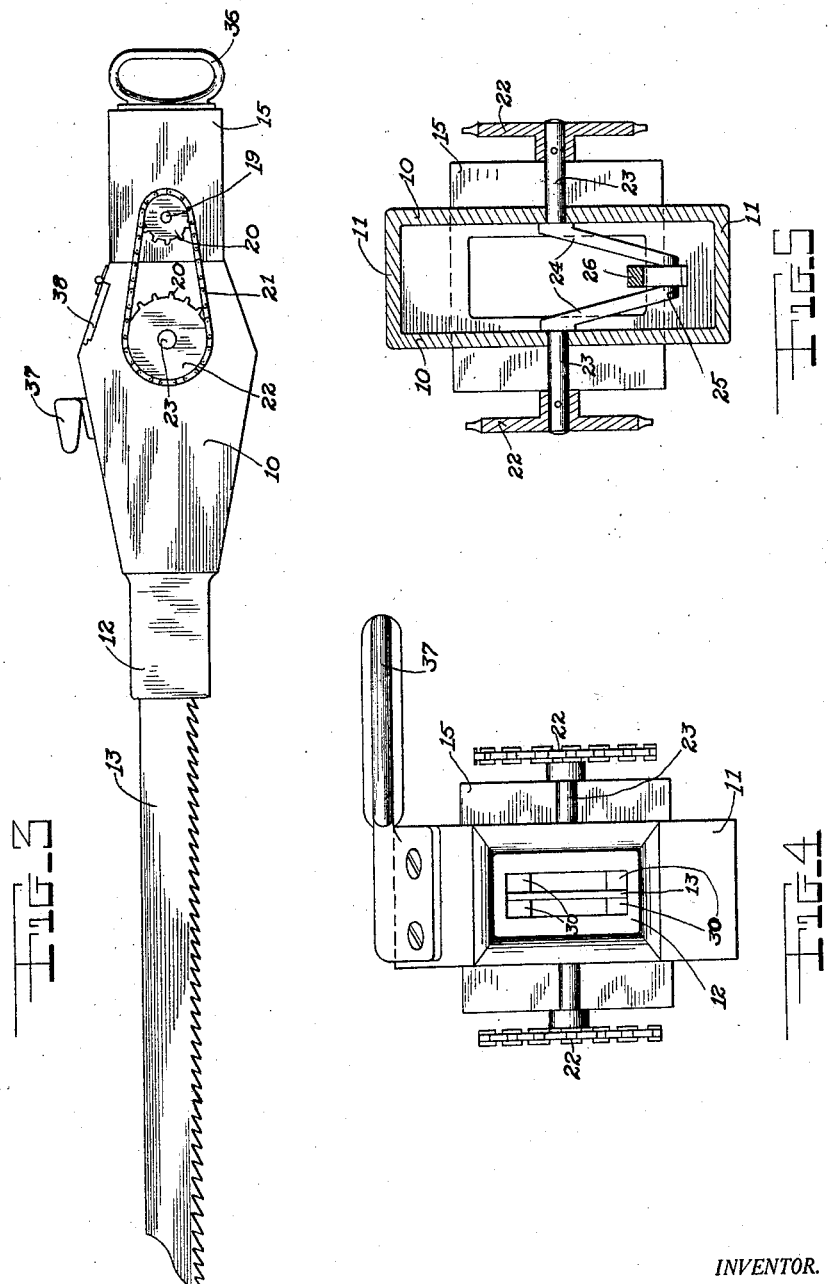

FILIKX DYLNICKI, OF WORTHINGTON, WEST VIRGINIA.

PORTABLE POWER SAW.

1,414,265. Specification of Letters Patent. Patented Apr. 25, 1922.

Application filed February 4, 1920. Serial No. 356,208.

*To all whom it may concern:*

Be it known that I, FILIKX DYLNICKI, a citizen of Poland, residing at Worthington, county of Marion, and State of West Virginia, have invented certain new and useful Improvements in Portable Power Saws, of which the following is a specification.

This invention relates to a portable reciprocating power saw and it has for an object to provide a simple power driven saw capable of use on any type of work on which the ordinary hand saws are usually employed.

A further object is to provide a suitable guide or frame which is held stationary in the hands of the user while the saw blade reciprocates.

For further comprehension of the invention, and of the objects and advantages thereof, reference will be had to the following description and accompanying drawings, and to the appended claim in which the various novel features of the invention are more particularly set forth.

Figure 1 of the drawings is a rear edge view of a portable power saw constructed according to my invention.

Figure 2 is an enlarged longitudinal sectional view thereof taken on the line 2—2 of Figure 1.

Figure 3 is a side view of the saw.

Figure 4 is a front end view.

Figure 5 is a transverse section on the line 5—5 of Figure 2.

As here shown my improved saw comprises briefly an elongated casing carrying the power mechanism and having one end constructed to form a guide for the saw blade the body of this casing comprising the flat parallel side walls 10 connected by the edge walls 11. This casing has a diminished extension 12 at one end forming a cross head guide for the saw blade 13, the latter being of any well known type suitable for the work to be operated on.

The opposite end of the casing body has fixed thereto a somewhat wider supplementary casing member 15 or box in which is mounted an electric motor 16 operatively connected to the saw. The operative connection between the motor and the saw comprises a spur pinion 17 fixed on the motor shaft and meshing with a gear 18 fixed on a shaft 19 extending transversely in the casing and suitably journaled in the side walls thereof. This shaft projects beyond the casing at each end and has fixed upon opposite projecting ends a pair of sprocket wheels 20 connected by sprocket chains 21 with a second pair of sprocket wheels 22 on a shaft 23 extending transversely of the casing body and journaled in the side walls 10 thereof. This shaft 23 is formed in two sections united by the crank arms 24, to the wrist pin 25 whereof is connected the rear end of a connecting rod 26 whose forward end is connected to a crosshead frame whereby the saw is guided and reciprocated.

This crosshead frame comprises a pair of bars 30 disposed in line with opposite edges of the saw and having the latter detachably secured to their forward ends by pins 31. The rear ends of the bars are rigidly connected by a pair of straps 32 between which the end of the connecting rod 26 projects and to which it is pivotally attached as at 33, the straps being secured to opposite faces of the bars 30 by rivets 34. Fixed to the inner end of the extension 12 and extending transversely across the latter in slidable engagement with the inner faces of the bars 30 are transverse webs 35 which may be formed integral with the casing or otherwise and which assist in guiding the crosshead frame.

The saw is preferably provided with a pair of handles 36 and 37 respectively, the former being secured to the rear wall of the motor casing in the median line of the saw, while the latter is secured to the top edge wall 11 of the casing body, being offset in a transverse direction as shown.

The edge walls 11 of the casing may flare outwardly from the ends to a point adjacent the crank arms 24 to accommodate the latter, and the top wall may have an opening closed by a hinged door 38 for access to the interior of the casing.

It is believed that the manner of use of my improved saw will be apparent from the above description, the motor 16 having suitable flexible wires, controlled by any hand switch, leading thereto. It will be obvious that when the motor is running reciprocation will be imparted at a reduced speed to the saw blade. The handles will be grasped in the right and left hands respectively and the saw blade applied upon the work. When the crosshead is in its forward position the pins 31 are exposed and the saw blade can be readily removed for sharpening or for replacing by a different blade, it being obvious that different types of saw blades may be employed according to the work to be done.

Having thus described my invention what I claim as new and desire to secure by Letters Patent of the United States is as follows—

A portable power saw, comprising a casing, a pair of parallel bars disposed in line with opposite edges of the saw, pins for detachably securing the saw to the forward ends of said bars, a pair of straps rigidly connecting the rear ends of said bars, an operating rod extending between said straps and pivotally attached to the same, rivets for securing said straps to opposite faces of said bars, and transverse webs slidably engaging the inner faces of said bars for guiding said cross head within said casing.

In testimony whereof I have affixed my signature.

FILIKX DYLNICKI.